US011601824B2

(12) United States Patent
Hamidi-Sepehr et al.

(10) Patent No.: US 11,601,824 B2
(45) Date of Patent: Mar. 7, 2023

(54) TCI AND QCL CONFIGURATION IN 5G NETWORKS

(71) Applicant: Apple Inc., Cupertino, CA (US)

(72) Inventors: Fatemeh Hamidi-Sepehr, Santa Clara, CA (US); Debdeep Chatterjee, San Jose, CA (US); Bishwarup Mondal, San Ramon, CA (US); Sergey Panteleev, Nizhny Novgorod (RU); Toufiqul Islam, Santa Clara, CA (US); Yushu Zhang, Beijing (CN); Alexei Vladimirovich Davydov, Nizhny Novgorod (RU)

(73) Assignee: Apple Inc., Cupertino, CA (US)

( * ) Notice: Subject to any disclaimer, the term of this patent is extended or adjusted under 35 U.S.C. 154(b) by 88 days.

(21) Appl. No.: 17/259,057

(22) PCT Filed: Aug. 7, 2019

(86) PCT No.: PCT/US2019/045511
§ 371 (c)(1),
(2) Date: Jan. 8, 2021

(87) PCT Pub. No.: WO2020/033549
PCT Pub. Date: Feb. 13, 2020

(65) Prior Publication Data
US 2021/0306867 A1 Sep. 30, 2021

Related U.S. Application Data

(60) Provisional application No. 62/717,347, filed on Aug. 10, 2018.

(51) Int. Cl.
*H04W 16/28* (2009.01)
*H04W 72/04* (2023.01)
*H04W 72/044* (2023.01)

(52) U.S. Cl.
CPC ......... *H04W 16/28* (2013.01); *H04W 72/042* (2013.01); *H04W 72/046* (2013.01); *H04W 72/0466* (2013.01)

(58) Field of Classification Search
CPC . H04W 16/28; H04W 72/042; H04W 72/046; H04W 72/0466; H04B 7/0695;
(Continued)

(56) References Cited

U.S. PATENT DOCUMENTS

| 2018/0376339 A1* | 12/2018 | Hu | H04L 5/0098 |
| 2019/0253904 A1* | 8/2019 | Tsai | H04L 5/0053 |
| 2019/0260458 A1* | 8/2019 | Zhou | H04B 7/0877 |

FOREIGN PATENT DOCUMENTS

WO  2018030708 A1  2/2018

OTHER PUBLICATIONS

International Search Report and Written Opinion for International Application No. PCT/US2019/045511, dated Nov. 21, 2019, 9 pgs.
(Continued)

*Primary Examiner* — Kiet Tang
(74) *Attorney, Agent, or Firm* — Kowert, Hood, Munyon, Rankin & Goetzel, P.C.

(57) ABSTRACT

User equipment (UE) includes processing circuitry coupled to memory. To configure the UE for multi-transmission reception point (TRP) reception, the processing circuitry is to decode radio resource control (RRC) signaling. The RRC signaling includes configuration information configuring a plurality of transmission configuration indication (TCI) states. A media access control (MAC) control element (CE) is decoded, where the MAC CE indicates multiple active TCI states of the configured plurality of TCI states. Multiple received beams are determined using the multiple active TCI states. Downlink information is decoded, where the downlink information originates from multiple TRPs and is
(Continued)

received via the determined multiple receive beams associated with the multiple active TCI states.

20 Claims, 10 Drawing Sheets

(58) Field of Classification Search
CPC .. H04J 11/0023; H04L 5/0044; H04L 5/0094; H04L 5/0053
See application file for complete search history.

(56) References Cited

OTHER PUBLICATIONS

International Preliminary Report on Patentability for International Application No. PCT/US2019/045511, dated Sep. 11, 2020, 17 pgs.
ZTE et al., 'Discussion on beam management', R1-1717424, 3GPP TSG RAN WG1 Meeting #90bis, Prague, Czechia, Oct. 3, 2017, 12 pgs.
Qualcomm, 'Summary on Beam Management Offline', R1-1716758, 3GPP TSG RAN WG1 Meeting #90bis, Nagoya, Japan, Sep. 20, 2017, 21 pgs.
Huawei et al., 'Remaining details of QCL assumptions', R1-1719443, 3GPP TSG RAN WG1 Meeting #91, Reno, USA, Nov. 17, 2017; 6 pgs.
NTT DOCOMO, Inc., 'Offline discussion for search space', R1-1801079, 3GPP TSG RAN WG1 NR Ad Hoc Meeting, Vancouver, Canada, Jan. 24, 2018, 4 pgs.

* cited by examiner

TCI AND QCL CONFIGURATION IN 5G NETWORKS

PRIORITY CLAIM

This application claims the benefit of priority to U.S. Provisional Patent Application Ser. No. 62/717,347, filed Aug. 10, 2018, and entitled "TCI/QCL CONFIGURATION ENHANCEMENTS FOR NR," which provisional patent application is incorporated herein by reference in its entirety.

TECHNICAL FIELD

Aspects pertain to wireless communications. Some aspects relate to wireless networks including 3GPP (Third Generation Partnership Project) networks, 3GPP LTE (Long Term Evolution) networks, 3GPP LTE-A (LTE Advanced) networks, and fifth-generation (5G) networks including 5G new radio (NR) (or 5G-NR) networks and 5G-LTE networks. Other aspects are directed to systems and methods for configuring transmission configuration indication (TCI) and quasi co-location (QCL) information in 5G networks.

BACKGROUND

Mobile communications have evolved significantly from early, voice systems to today's highly sophisticated integrated communication platform. With the increase in different types of devices communicating with various network devices, usage of 3GPP LTE systems has increased. The penetration of mobile devices (user equipment or UEs) in modern society has continued to drive demand for a wide variety of networked devices in a number of disparate environments. Fifth generation (5G) wireless systems are forthcoming and are expected to enable even greater speed, connectivity, and usability. Next generation 5G networks (or NR networks) are expected to increase throughput, coverage, and robustness and reduce latency and operational and capital expenditures. 5G-NR networks will continue to evolve based on 3GPP LTE-Advanced with additional potential new radio access technologies (RATs) to enrich people's lives with seamless wireless connectivity solutions delivering fast, rich content and services. As current cellular network frequency is saturated, higher frequencies, such as millimeter wave (mmWave) frequency, can be beneficial due to their high bandwidth.

Potential LTE operation in the unlicensed spectrum includes (and is not limited to) the LTE operation in the unlicensed spectrum via dual connectivity (DC), or DC-based LAA, and the standalone LTE system in the unlicensed spectrum, according to which LTE-based technology solely operates in unlicensed spectrum without requiring an "anchor" in the licensed spectrum, called MulteFire. MulteFire combines the performance benefits of LTE technology with the simplicity of Wi-Fi-like deployments.

Further enhanced operation of LTE systems in the licensed as well as unlicensed spectrum is expected in future releases and 5G systems. Such enhanced operations can include techniques to configure transmission configuration indication (TCI) and quasi co-location (QCL) configuration in 5G-NR networks.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various aspects discussed in the present document.

DETAILED DESCRIPTION

The following description and the drawings sufficiently illustrate aspects to enable those skilled in the art to practice them. Other aspects may incorporate structural, logical, electrical, process, and other changes. Portions and features of some aspects may be included in, or substituted for, those of other aspects. Aspects set forth in the claims encompass all available equivalents of those claims.

Figure 1A:
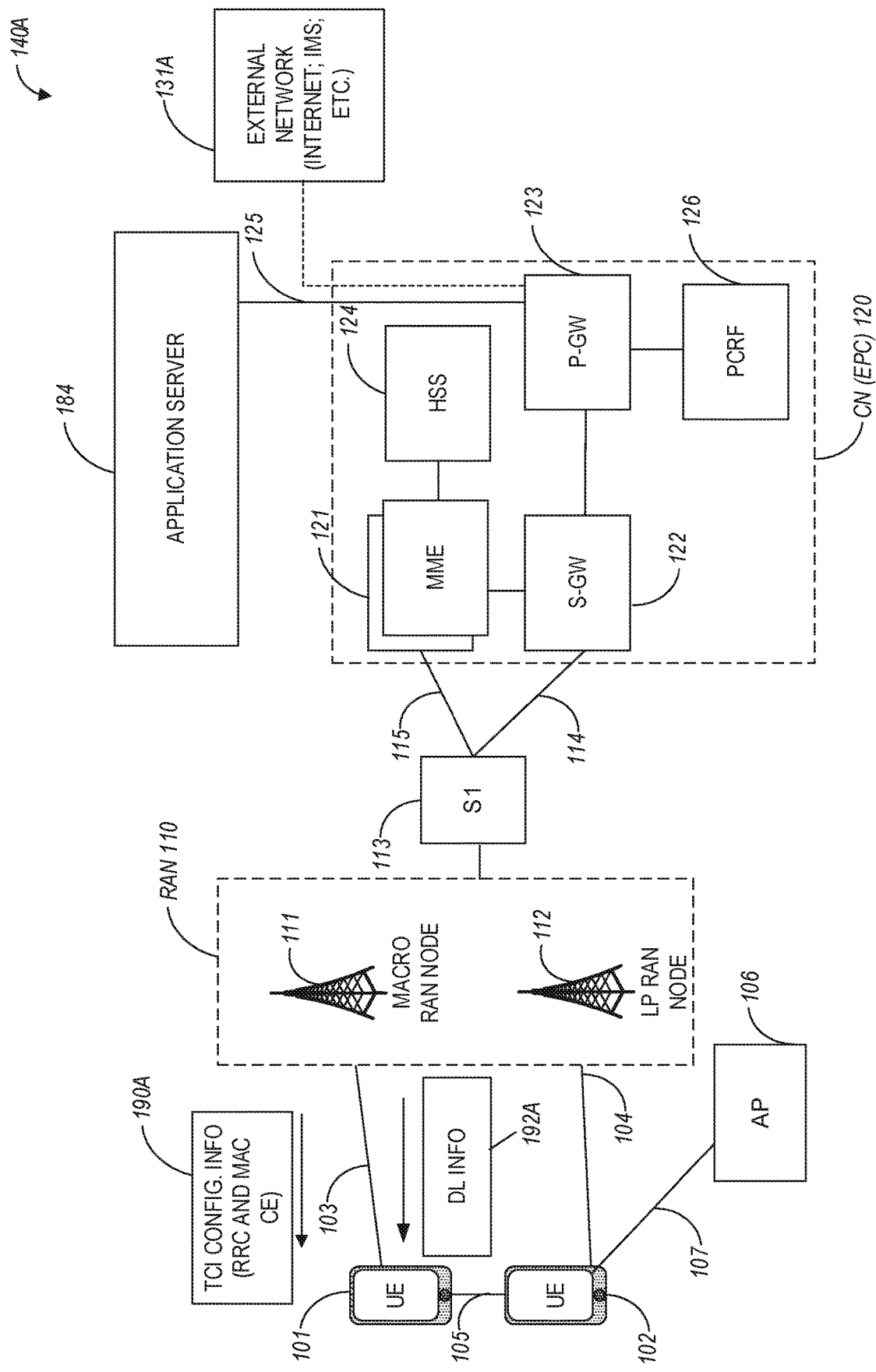
FIG. 1A illustrates an architecture of a network, in accordance with some aspects.

FIG. 1A illustrates an architecture of a network in accordance with some aspects. The network 140A is shown to include user equipment (UE) 101 and UE 102. The UEs 101 and 102 are illustrated as smartphones (e.g., handheld touch-screen mobile computing devices connectable to one or more cellular networks) but may also include any mobile or non-mobile computing device, such as Personal Data Assistants (PDAs), pagers, laptop computers, desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard.

LTE and LTE-Advanced are standards for wireless communications of high-speed data for UE such as mobile telephones. In LTE-Advanced and various wireless systems, carrier aggregation is a technology according to which multiple carrier signals operating on different frequencies may be used to carry communications for a single UE, thus increasing the bandwidth available to a single device. In some aspects, carrier aggregation may be used where one or more component carriers operate on unlicensed frequencies.

There are emerging interests in the operation of LTE systems in the unlicensed spectrum. As a result, an important enhancement for LTE in 3GPP Release 13 has been to enable its operation in the unlicensed spectrum via Licensed-Assisted Access (LAA), which expands the system bandwidth by utilizing the flexible carrier aggregation (CA) framework introduced by the LTE-Advanced system. Rel-13 LAA system focuses on the design of downlink operation on unlicensed spectrum via CA, while Rel-14 enhanced LAA (eLAA) system focuses on the design of uplink operation on unlicensed spectrum via CA.

Aspects described herein can be used in the context of any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and further frequencies and Spectrum Access System (SAS) in 3.55-3.7 GHz and further frequencies).

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT LIE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

In some aspects, NB-IoT devices can be configured to operate in a single physical resource block (PRB) and may be instructed to retune two different PRBs within the system bandwidth. In some aspects, an eNB-IoT UE can be configured to acquire system information in one PRB, and then it can retune to a different PRB to receive or transmit data.

In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol; a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In some aspects, the network 140A can include a core network (CN) 120. Various aspects of NG RAN and NG Core are discussed herein in reference to, e.g.; FIG. 1B, FIG. 1C, FIG. 1D, and FIG. 1E.

In an aspect, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a new generation node-B (gNB), an evolved node-B (eNB), or another type of RAN node.

In accordance with some aspects, the UEs 101 and 102 can be configured to communicate using Orthogonal Frequency-Division Multiplexing (OFDM) communication signals with each other or with any of the RAN nodes 111 and 112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe for sidelink communications), although such aspects are not required. The OFDM signals can comprise a plurality of orthogonal subcarriers.

In some aspects, a downlink resource grid can be used for downlink transmissions from any of the RAN nodes 111 and 112 to the UEs 101 and 102, while uplink transmissions can utilize similar techniques. The grid can be a time-frequency grid, called a resource grid or time-frequency resource grid, which is the physical resource in the downlink in each slot. Such a time-frequency plane representation may be used for OFDM systems, which makes it applicable for radio resource allocation. Each column and each row of the resource grid may correspond to one OFDM symbol and one OFDM subcarrier, respectively. The duration of the resource grid in the time domain may correspond to one slot in a radio frame. The smallest time-frequency unit in a resource grid may be denoted as a resource element. Each resource grid may comprise a number of resource blocks, which describe the mapping of certain physical channels to resource elements. Each resource block may comprise a collection of resource elements; in the frequency domain, this may, in some aspects, represent the smallest quantity of resources that currently can be allocated. There may be several different physical downlink channels that are conveyed using such resource blocks.

The physical downlink shared channel (PDSCH) may carry user data and higher-layer signaling to the UEs 101 and 102. The physical downlink control channel (PDCCH) may carry information about the transport format and resource allocations related to the PDSCH channel, among other things. It may also inform the UEs 101 and 102 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 111 and 112 based on channel quality information fed back from any of the UEs 101 and 102. The downlink resource assignment information may be sent on the PDCCH used for (e.g., assigned to) each of the UEs 101 and 102.

Some aspects may use concepts for resource allocation for control channel information that are an extension of the above-described concepts. For example, some aspects may utilize an enhanced physical downlink control channel (EPDCCH) that uses PDSCH resources for control information transmission. The EPDCCH may be transmitted using one or more enhanced control channel elements (ECCEs). Similar to above, each ECCE may correspond to nine sets of four physical resource elements known as an enhanced resource element groups (EREGs). An ECCE may have other numbers of EREGs according to some arrangements.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1E). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the EPC network 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123. The application server 184 may signal the PCRF 126 to indicate a new service flow and select the appropriate Quality of Service (QoS) and charging parameters. The PCRF 126 may provision this rule into a Policy and Charging Enforcement Function (PCEF) (not shown) with the appropriate traffic flow template (TFT) and QoS class of identifier (QCI), which commences the QoS and charging as specified by the application server 184.

In an example, any of the nodes 111 or 112 can be configured to communicate to the UEs 101, 102 (e.g., dynamically) an antenna panel selection and a receive (Rx) beam selection that can be used by the UE for data reception on a physical downlink shared channel (PDSCH) as well as for channel state information reference signal (CSI-RS) measurements and channel state information (CSI) calculation.

In an example, any of the nodes 111 or 112 can be configured to communicate to the UEs 101, 102 (e.g., dynamically) an antenna panel selection and a transmit (Tx) beam selection that can be used by the UE for data transmission on a physical uplink shared channel (PDSCH) well as for sounding reference signal (SRS) transmission.

In some aspects, the communication network 140A can be an IoT network. One of the current enablers of IoT is the narrowband-IoT (NB-IoT). NB-IoT has objectives such as coverage extension, UE complexity reduction, long battery lifetime, and backward compatibility with the LTE network. In addition, NB-IoT aims to offer deployment flexibility allowing an operator to introduce NB-IoT using a small portion of its existing available spectrum, and operate in one of the following three modalities: (a) standalone deployment (the network operates in re-farmed GSM spectrum); (b) in-band deployment (the network operates within the LTE channel); and (c) guard-band deployment (the network operates in the guard band of legacy LTE channels).

In some aspects, the UE 101 can support connectivity to a 5G core network (5GCN) (or 5G access network or 5G-AN) and can be configured to operate with Early Data Transmission (EDT) in a communication architecture that supports one or more of Machine Type Communications (MTC), enhanced MTC (eMTC), further enhanced MTC (feMTC), even further enhanced MTC (efeMTV), and narrowband Internet-of-Things (NB-IoT) communications. When operating with EDT, a physical random access channel (PRACH) procedure message 3 (MSG3) can be used to carry the short uplink (UL) data and PRACH procedure message 4 (MSG4) can be used to carry short downlink (DL) data (if any is available). When a UE wants to make a new RRC connection, it first transmits one or more preambles, which can be referred to as PRACH procedure message 1 (MSG1). The MSG4 can also indicate UE to immediately go to IDLE mode. For this purpose, the transport block size (TBS) scheduled by the UL grant received for the MSG3 to transmit UL data for EDT needs to be larger than the TBS scheduled by the legacy grant. In some aspects, the UE can indicate its intention of using the early data transmission via MSG1 using a separate PRACH resource partition. From MSG1, eNB knows that it has to provide a grant scheduling TBS values that may differ from legacy TBS for MSG3 in the random-access response (RAR or MSG2) so that the UE can transmit UL data in MSG3 for EDT. However, the eNB may not exactly know what would be the size of UL data the UE wants to transmit for EDT and how large a UL grant for MSG3 would be needed, though a minimum and a maximum TBS for the UL grant could be defined. The following two scenarios may occur: (a) The UL grant provided in RAR is larger than the UL data plus header. In this case, layer 1 needs to add one or more padding bits in the remaining grant. However, transmitting a large number of padding bits (or useless bits) is not power efficient especially in deep coverage where a larger number of repetitions of transmission is required. (b) Similarly, when the UL grant provided in RAR is large but falls short to accommodate the UL data for the EDT, the LIE may have to send only the legacy RRC message to fallback to legacy RRC connection. In this case, UE may again need to transmit a number of padding bits, which can be inefficient. As used herein, the term "PRACH procedure" can be used interchangeably with the term "Random Access procedure" or "RA procedure".

In some aspects and as described hereinbelow in connection with FIGS. 2-5, the UE can be configured with TCI/QCL enhancements for communication sin 5G networks. More specifically, UE 101 can receive configuration information 190A from the base station 111, which can be used for configuring a plurality of available TCI states at the UE. The configuration information 190A can also include an indication of one or more active TCI states of the configured plurality of TCI states. In some aspects, the configuration information configuring the available TCI states can be communicated via RRC signaling, and the configuration information for selecting the active TCI states can be communicated via media access control (MAC) control element (CE) signaling. The UE 101 can determine multiple receive beam see using the one or more active TCI states. The UE 101 can also decode downlink information 192A, where the downlink information originates from multiple transmission—reception points (TRPs) (e.g., base stations) of the downlink information is received via the determined multiple receive beams associated with the one or more active TCI states. Traditional configuration enhancements in connection with TCI/QCI, configurations is disclosed in connection with FIGS. 2-5.

Figure 1B:
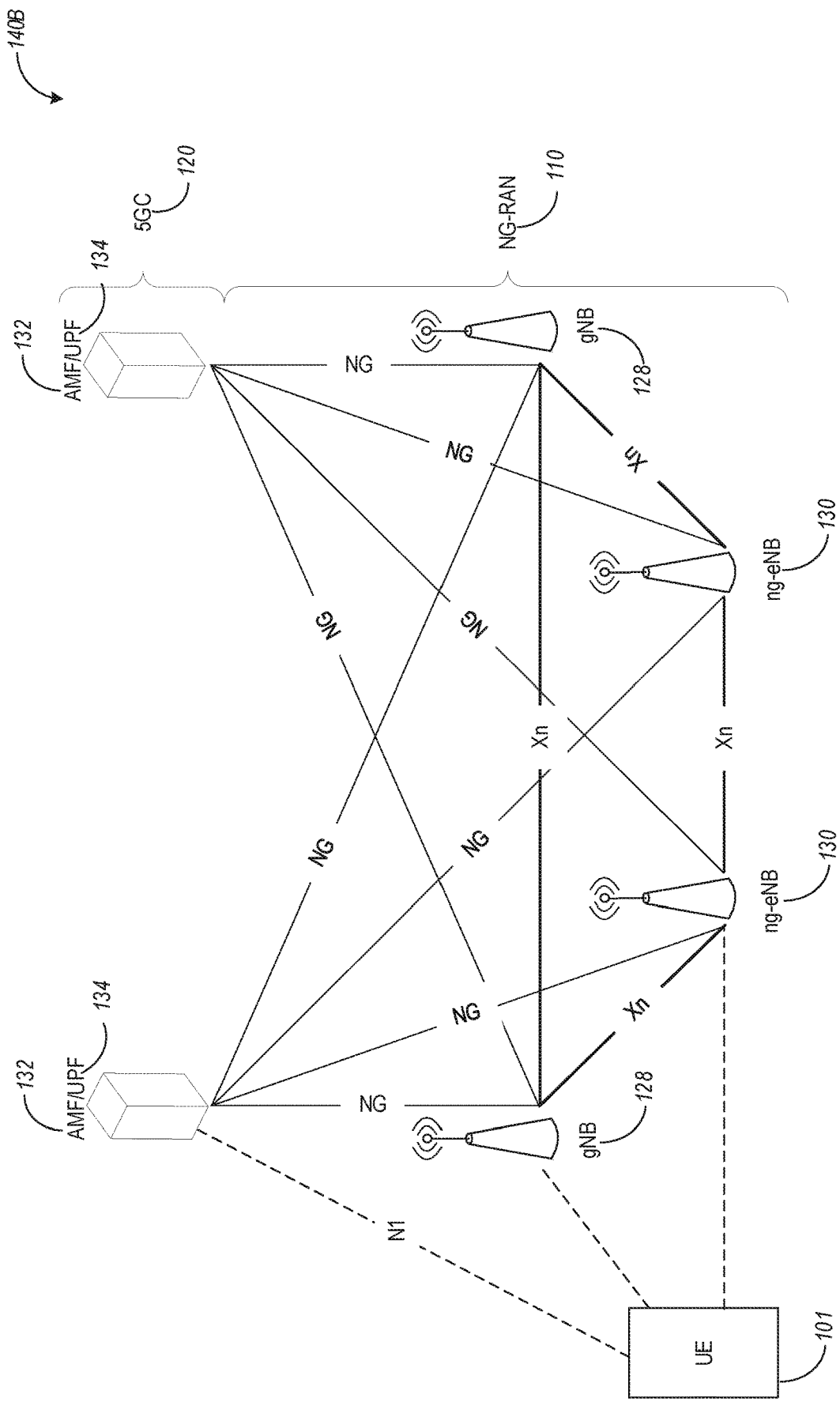
FIG. 1B is a simplified diagram of an overall next generation (NG) system architecture, in accordance with some aspects.

FIG. 1B is a simplified diagram of a next generation (NG) system architecture 140B in accordance with some aspects. Referring to FIG. 1B, the NG system architecture 140B includes RAN 110 and a 5G network core (5GC) 120. The NG-RAN 110 can include a plurality of nodes, such as gNBs 128 and NG-eNBs 130.

The core network 120 (e.g., a 5G core network or 5GC) can include an access and mobility function (AMF) 132 and/or a user plane function (UPF) 134. The AMF 132 and the UPF 134 can be communicatively coupled to the gNBs 128 and the NG-eNBs 130 via NG interfaces. More specifically, in some aspects, the gNBs 128 and the NG-eNBs 130 can be connected to the AMF 132 by NG-C interfaces, and to the UPF 134 by NG-U interfaces. The gNBs 128 and the NG-eNBs 130 can be coupled to each other via Xn interfaces.

In some aspects, a gNB 128 can include a node providing new radio (NR) user plane and control plane protocol termination towards the UE and is connected via the NG interface to the 5GC 120. In some aspects, an NG-eNB 130 can include a node providing evolved universal terrestrial radio access (E-UTRA) user plane and control plane protocol terminations towards the UE and is connected via the NG interface to the 5GC 120.

In some aspects, the NG system architecture 140B can use reference points between various nodes as provided by 3GPP Technical Specification (TS) 23.501 (e.g., V15.4.0, 2018-12).

In some aspects, each of the gNBs 128 and the NG-eNBs 130 can be implemented as a base station, a mobile edge server, a small cell, a home eNB, and so forth.

In some aspects, node 128 can be a master node (MN) and node 130 can be a secondary node (SN) in a 5G architecture. The MN 128 can be connected to the AMF 132 via an NG-C interface and to the SN 128 via an XN-C interface. The MN 128 can be connected to the UPF 134 via an NG-U interface and to the SN 128 via an XN-U interface.

Figure 1C:
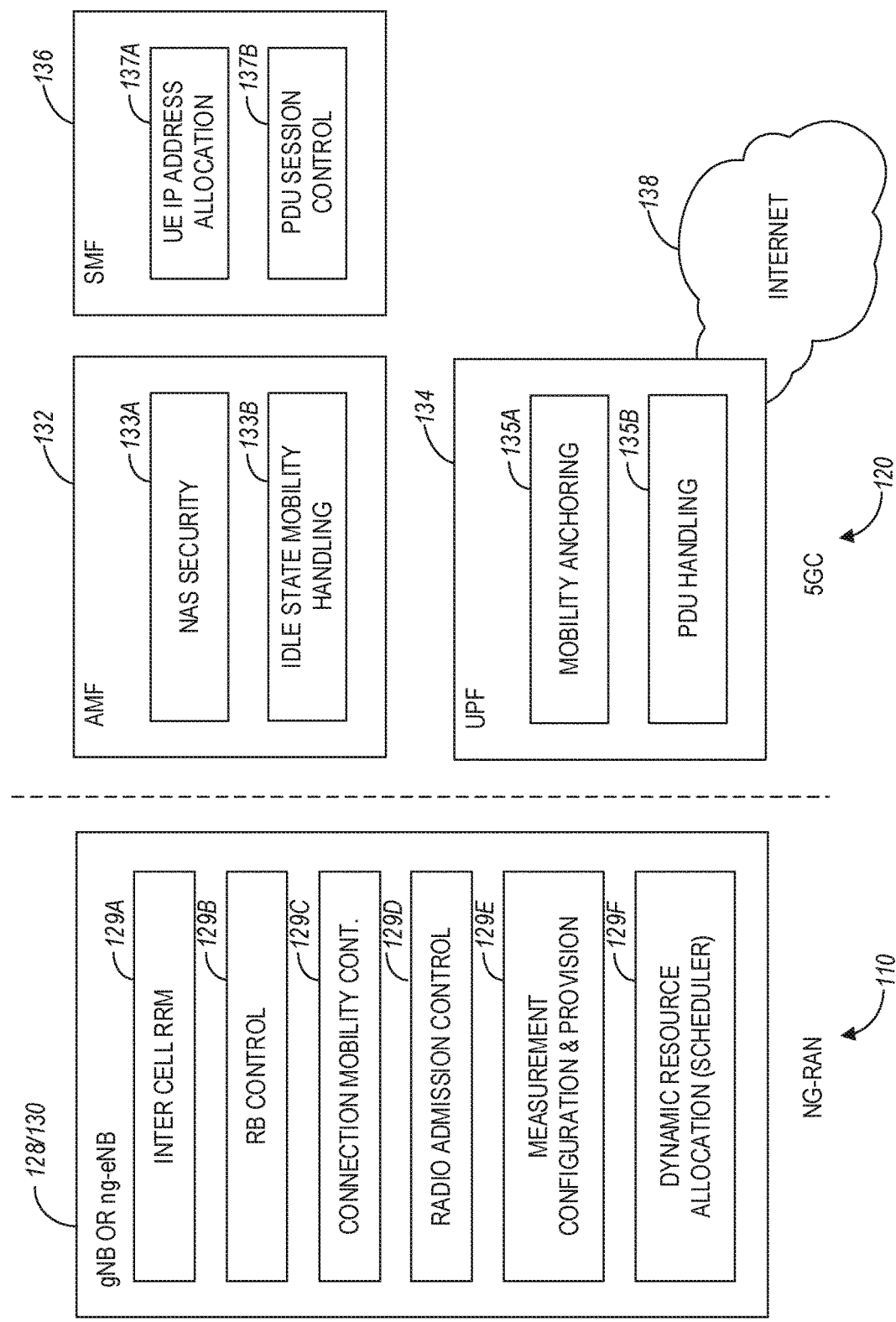
FIG. 1C illustrates a functional split between next generation radio access network (NG-RAN) and the 5G Core network (5GC), in accordance with some aspects.

FIG. 1C illustrates a functional split between NG-RAN and the 5G Core (5GC) in accordance with some aspects. Referring to FIG. 1C, there is illustrated a more detailed diagram of the functionalities that can be performed by the gNBs 128 and the NG-eNBs 130 within the NG-RAN 110, as well as the AMF 132, the UPF 134, and the SMF 136 within the 5GC 120. In some aspects, the 5GC 120 can provide access to the Internet 138 to one or more devices via the NG-RAN 110.

In some aspects, the gNBs 128 and the NG-eNBs 130 can be configured to host the following functions: functions for Radio Resource Management (e.g., inter-cell radio resource management 129A, radio bearer control 129B, connection mobility control 129C, radio admission control 129D, dynamic allocation of resources to UEs in both uplink and downlink (scheduling) 129F); IP header compression, encryption and integrity protection of data; selection of an AMF at UE attachment when no routing to an AMF can be determined from the information provided by the UE; routing of User Plane data towards UPF(s); routing of Control Plane information towards AMF; connection setup and release; scheduling and transmission of paging messages (originated from the AMF); scheduling and transmission of system broadcast information (originated from the AMF or Operation and Maintenance); measurement and measurement reporting configuration for mobility and scheduling 129E; transport level packet marking in the uplink; session management; support of network slicing; QoS flow management and mapping to data radio bearers; support of UEs in RRC_INACTIVE state; distribution function for non-access stratum (NAS) messages; radio access network sharing; dual connectivity; and tight interworking between NR and E-UTRA, to name a few.

In some aspects, the AMF 132 can be configured to host the following functions, for example: NAS signaling termination; NAS signaling security 133A; access stratum (AS) security control; inter-core network (CN) node signaling for mobility between 3GPP access networks; idle state/mode mobility handling 133B, including mobile device, such as a UE reachability (e.g., control and execution of paging retransmission); registration area management; support of intra-system and inter-system mobility; access authentication; access authorization including check of roaming rights; mobility management control (subscription and policies); support of network slicing; and/or SMF selection, among other functions.

The UPF 134 can be configured to host the following functions, for example: mobility anchoring 135A (e.g., anchor point for Intra-/Inter-RAT mobility); packet data unit (PDU) handling 135B (e.g., external PDU session point of interconnect to data network); packet routing and forwarding; packet inspection and user plane part of policy rule enforcement; traffic usage reporting; uplink classifier to support routing traffic flows to a data network; branching point to support multi-homed PDU session; QoS handling for user plane, e.g., packet filtering, gating, UL/DL, rate enforcement; uplink traffic verification (SDF to QoS flow mapping); and/or downlink packet buffering and downlink data notification triggering, among other functions.

The Session Management function (SMF) 136 can be configured to host the following functions, for example: session management; UE IP address allocation and management 137A; selection and control of user plane function (UPF); PDU session control 137B, including configuring traffic steering at UPF 134 to route traffic to proper destination; control part of policy enforcement and QoS; and/or downlink data notification, among other functions.

Figure 1D:
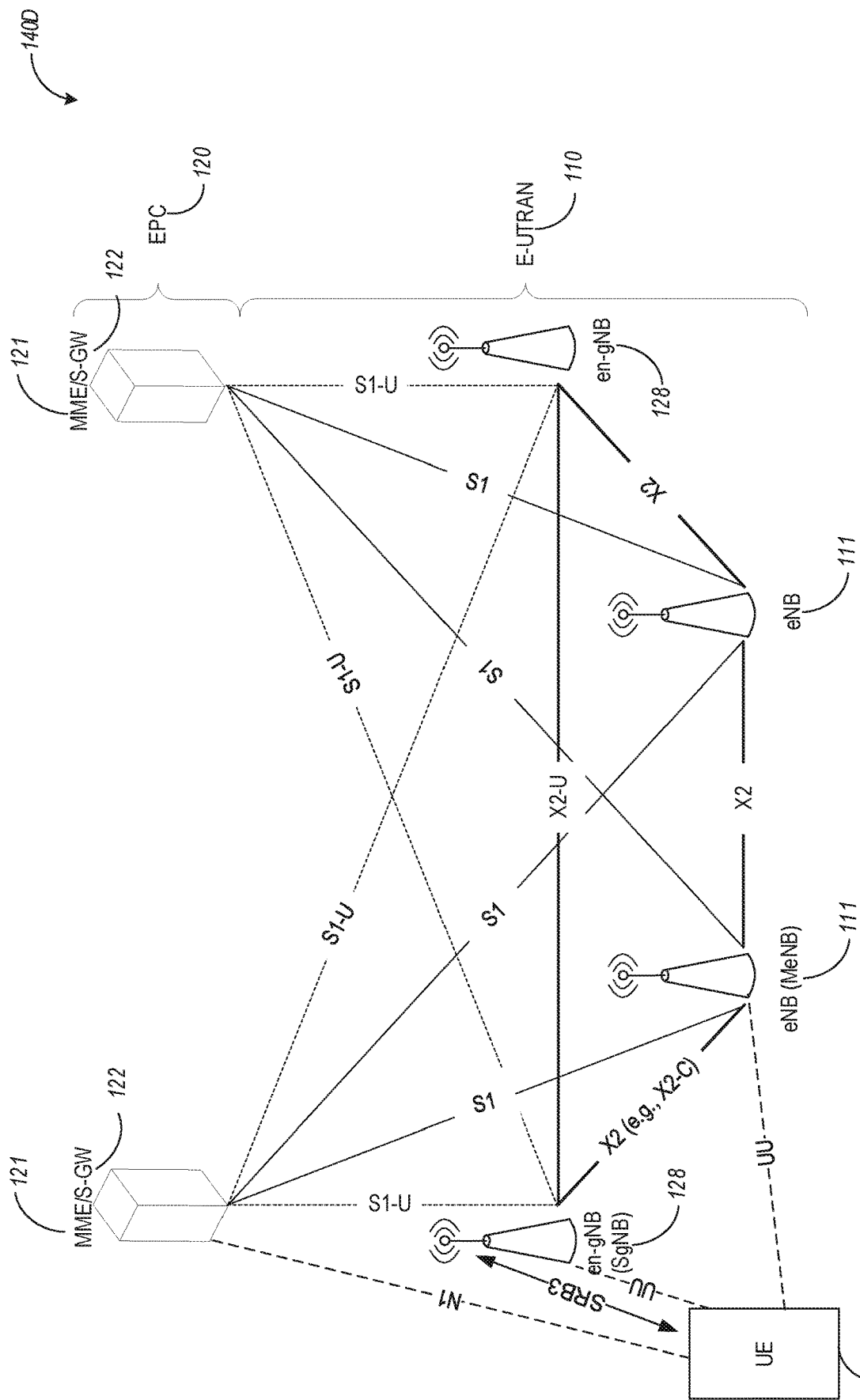
FIG. 1D illustrates an example Evolved Universal Terrestrial Radio Access (E-UTRA) New Radio Dual Connectivity (EN-DC) architecture, in accordance with some aspects.

FIG. 1D illustrates an example Evolved Universal Terrestrial Radio Access (E-UTRA) New Radio Dual Connectivity (EN-DC) architecture, in accordance with some aspects. Referring to FIG. 1D, the EN-DC architecture 140D includes radio access network (or E-TRA network, or E-TRAN) 110 and EPC 120. The EPC 120 can include MMEs 121 and S-GWs 122. The E-UTRAN 110 can include nodes 111 (e.g., eNBs) as well as Evolved Universal Terrestrial Radio Access New Radio (EN) next generation evolved Node-Bs (en-gNBs) 128.

In some aspects, en-gNBs 128 can be configured to provide NR user plane and control plane protocol terminations towards the UE 102 and acting as Secondary Nodes (or SgNBs) in the EN-DC communication architecture 140D. The eNBs 111 can be configured as master nodes (or MeNBs) and the eNBs 128 can be configured as secondary nodes (or SgNBs) in the EN-DC communication architecture 140D. As illustrated in FIG. 1D, the eNBs 111 are connected to the EPC 120 via the S1 interface and to the EN-gNBs 128 via the X2 interface. The EN-gNBs (or SgNBs) 128 may be connected to the EPC 120 via the S1-U interface, and to other EN-gNBs via the X2-U interface. The SgNB 128 can communicate with the HE 102 via a UU interface (e.g., using signaling radio bearer type 3, or SRB3 communications as illustrated in FIG. 1D), and with the MeNB 111 via an X2 interface (e.g., X2-C interface). The MeNB 111 can communicate with the UE 102 via a UU interface.

Even though FIG. 1D is described in connection with EN-DC communication environment, other types of dual connectivity communication architectures (e.g., when the UE 102 is connected to a master node and a secondary node) can also use the techniques disclosed herein.

In some aspects, the MeNB 111 can be connected to the MME 121 via S1-MMF interface and to the SgNB 128 via an X2-C interface. In some aspects, the MeNB 111 can be connected to the SGW 122 via S1-U interface and to the SgNB 128 via an X2-U interface. In some aspects associated with dual connectivity (DC) and/or MultiRate-DC (MR-DC), the Master eNB (MeNB) can offload user plane traffic to the Secondary gNB (SgNB) via split bearer or SCG (Secondary Cell Group) split bearer.

Figure 1E:
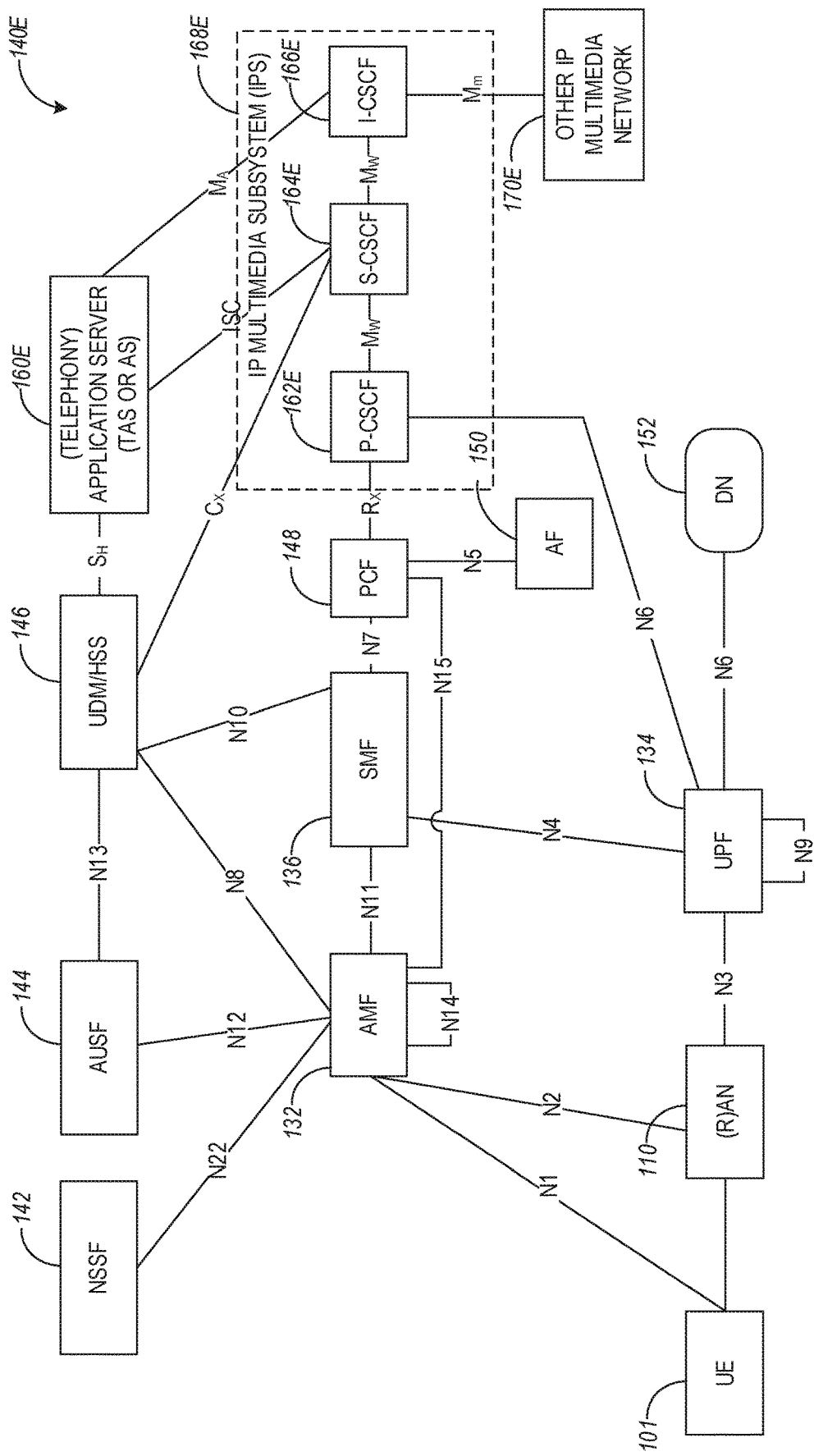
FIG. 1E illustrates a non-roaming 5G system architecture in accordance with some aspects.

FIG. 1E illustrates a non-roaming 5G system architecture in accordance with some aspects. Referring to FIG. 1E, there is illustrated a 5G system architecture 140E in a reference point representation. More specifically, UE 102 can be in communication with RAN 110 as well as one or more other 5G core (5GC) network entities. The 5G system architecture 140E includes a plurality of network functions (NFs), such as access and mobility management function (AMF) 132, session management function (SMF) 136, policy control function (PCF) 148, application function (AF) 150, user plane function (UPF) 134, network slice selection function (NSSF) 142, authentication server function (AUSF) 144, and unified data management (UDM)/home subscriber server (HSS) 146. The UPF 134 can provide a connection to a data network (DN) 152, which can include, for example, operator services, Internet access, or third-party services. The AMF 132 can be used to manage access control and mobility and can also include network slice selection functionality. The SMF 136 can be configured to set up and manage various sessions according to a network policy. The UPF 134 can be deployed in one or more configurations according to a desired service type. The PCF 148 can be configured to provide a policy framework using network slicing, mobility management, and roaming (similar to PCRF in a 4G communication system). The UDM can be configured to store subscriber profiles and data (similar to an HSS in a 4G communication system).

In some aspects, the 5G system architecture 140E includes an IP multimedia subsystem (IMS) 168E as well as a plurality of IP multimedia core network subsystem entities, such as call session control functions (CSCFs). More specifically, the IMS 168E includes a CSCF, which can act as a proxy CSCF (P-CSCF) 162E, a serving CSCF (S-CSCF) 164E, an emergency CSCF (E-CSCF) (not illustrated in FIG. 1E), or interrogating CSCF (I-CSCF) 166E. The P-CSCF 162E can be configured to be the first contact point for the UE 102 within the IM subsystem (IMS) 168E. The S-CSCF 164E can be configured to handle the session states in the network, and the E-CSCF can be configured to handle certain aspects of emergency sessions such as routing an emergency request to the correct emergency center or PSAP. The I-CSCF 166E can be configured to function as the contact point within an operators network for all IMS connections destined to a subscriber of that network operator, or a roaming subscriber currently located within that network operator's service area. In some aspects, the I-CSCF 166E can be connected to another IP multimedia network 170E, e.g. an IMS operated by a different network operator.

In some aspects, the UDM/HSS 146 can be coupled to an application server 160E, which can include a telephony application server (TAS) or another application server (AS). The AS 160E can be coupled to the IMS 168E via the S-CSCF 164E or the I-CSCF 166E. In some aspects, the 5G system architecture 140E can use unified access barring mechanism using one or more of the techniques described herein, which access barring mechanism can be applied for all RRC states of the UE 102, such as RRC_IDLE, RRC_CONNECTED, and RRC_INACTIVE states.

In some aspects, the 5G system architecture 140E can be configured to use 5G access control mechanism techniques described herein, based on access categories that can be categorized by a minimum default set of access categories, which are common across all networks. This functionality can allow the public land mobile network PLMN, such as a visited PLMN (VPLMN) to protect the network against different types of registration attempts, enable acceptable service for the roaming subscriber and enable the VPLMN to control access attempts aiming at receiving certain basic services. It also provides more options and flexibility to individual operators by providing a set of access categories, which can be configured and used in operator-specific ways.

A reference point representation shows that interaction can exist between corresponding NF services. For example, FIG. 1E illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1E can also be used.

Mobile communication has evolved significantly from early voice systems to today's highly sophisticated integrated communication platform. The next generation wireless communication system, 5G, or new radio (NR) will provide access to information and sharing of data anywhere, anytime by various users and applications. NR is expected to be a unified network/system that target to meet vastly different and sometime conflicting performance dimensions and services. Such diverse multi-dimensional requirements are driven by different services and applications. In general, NR will evolve based on 3GPP LTE-Advanced with additional potential new Radio Access Technologies (RATS) to enrich people lives with better, simple and seamless wireless connectivity solutions. NR will enable everything connected by wireless and deliver fast, rich contents and services.

Multi-TRP transmission of downlink control information (DCI) forms one aspect to be considered as part of PDCCH enhancements in next releases of NR specifications (e.g., towards enabling ultra-reliable low-latency operations). In some aspects, the same DCI (at least similar scheduling decision for a given TB) is carried by multiple PDCCHs, e.g., over ideal backhaul (while non-ideal backhaul between TRPs may still be a useful case for improved reliability targets).

Multi-TRP transmission can be intended to enhance the reliability of the control channel transmission, while for data transmission, other approaches may be applied. This PDCCH enhancement approach may not necessarily mandate combining of information at the UE. Accordingly, different aspects need to be considered for further enhancements and adjustments.

In some aspects, the TCI state may provide QCL configuration/indication for PDCCH, and the QCL, configuration for PDCCH contains information which provides a reference to a TCI state. The number of DCIs with different QCL assumptions that can be sent to a UE, may be bounded by the number of CORESETs, TCI states configured in a CORESET, and how flexibly the TCI can be changed for the CORESET. Accordingly, the number of TCI states for PDCCH reception is one aspect for further considerations, due to the limitations on how flexibly and/or how many different beams can be configured.

On the other hand, limiting the maximum number of CORESETs configured to a HE per bandwidth part (BWP), may be beneficial for enabling more practical RRC signaling and better HE dimensioning. In some aspects, three CORESETs configurable per BWP may be supported, which provides sufficient flexibility. However, as part of the enhancements to robustness and reliability performance of PDCCH required under multi-TRP operations, enabling support of a larger number of TCI states for PDCCH monitoring can be beneficial, as well as increasing the number of CORESETs (assuming that aspects in terms of TCI to CORESET association can remain the same).

One direction of enhancements may be to allow multiple active TCI states per CORESET, and associate/indicate a particular (amongst the multiple states configured by RRC or MAC CE depending on the particular scheme as will be discussed hereinbelow) active TCI state for monitoring of the PDCCH candidates as part of the corresponding search space configuration that points to this CORESET.

In some aspects, increasing the number of RS sharing the same QCL type in a TCI state, and adopting more number of beams for PDCCH reception can also be considered to enhance the robustness of PDCCH.

In some aspects, increasing the number of TCI states configured per CORESET, and the number of CORESET's configurable to the UE, have effectively similar impact to UE implementation, as far as PDCCH is concerned. The difference is mainly in terms of signaling and configurations.

A summary background of the current possible approaches for TCI state configurations, as well as how/why some of the current design elements, may need further enhancements is discussed hereinbelow.

Summary of TCI states configuration schemes.

In NR, three schemes are supported regarding the beam indication, in terms of PDSCH reception: (a) RRC signaling configures a single TCI state; (b) RRC signaling configures N TCI states and MAC CE down-selects one of them; and (c) RRC signaling configures N TCI states, MAC CE down-selects M of them (called active TCI states), and DCI is used to indicate one (as an active state) from the M TCI states.

In some aspects, if a scheduling offset is smaller than a UE reported value, the UE may use the same beam to receive PDSCH with a CORESET in latest slot.

As of PDCCH reception, the following two corresponding beam indication schemes may be used: (a) RRC signaling configures a single TCI state; and (b) RRC signaling configures N TCI states and MAC CE down-selects one of them.

In some aspects, the UE may be configured to track only one active TCI state per CORESET at any time, in terms of PDCCH reception. This means that the UE only tracks the TCI state indicated by MAC CE. This limitation is mainly due to UE implementation complexity burden.

In some aspects, up to 64 TCI states can be configured by RRC signaling (the UE may not track all of them). In some aspects, there may be up to 8 active TCI states (where the exact number is based on the UE capability, which can be indicated by the UE). The number of TCI states that the UE could support may be the number of TCI states configured by RRC signaling.

In some aspects, the MAC CE latency may be 3 ms, starting from the transmission of ACK of MAC CE. Whether this latency is sufficient for UE to be able to track and acquire a new TCI state (in case the number of active TCI states that UE should track at any time regarding the PDCCH reception requires enhancement) or not, depends on the gNB's configuration of total radiated sensitivity (TRS). This latency may not mean the UE can finish the tracking of the TCI state. For example, if there is no TRS transmitted within 3 ms, the test requirement may not be the same as the case with TRS.

Currently, the LTE or 5G specifications do not define any method to bound the maximum duration within which there is no TRS transmitted, to ensure that the UE can track the TCI faster, and this matter depends on gNB's implementation.

In some aspects, if a new TCI is indicated (i.e., a MAC CE based TCI indication), the gNB may reserve some time for the UE to track this new TCI state.

In general, considerations regarding the support of multi-TRP transmission of DCI are different in terms of frequency range 1 (FR1) vs. FR2 operations (below and above 6 GHz, respectively), e.g., in terms of the assumptions for the UE RF and number of antennas.

In some aspects, for FR1, the potential issue of the number configurable TCI states per CORESET being the bottleneck of PDCCH operation is less pronounced. Furthermore, factoring in the "switching times" as mentioned earlier, that are mostly relevant to switching of Rx spatial parameters, may not impose much challenges for FR1 operations. For such use cases, different TCI states mainly correspond to QCL, parameters such as average delay, Doppler, and SNR, which are more relevant to multi-TRP operation. In some aspects, if there is no QCL type D configured in a TCI state, the UE may derive other QCL information from the indicated TCI state regardless of scheduling offset.

In some aspects, for FR2 operation with multi-panel enabled UE, enhancements to the TCI association on CORESET basis may be needed, regardless of the multi-TRP transmission of DCI. This is because the UE can monitor and receive on simultaneous beams using two different panels. Therefore, such enhancements may address the TCI limitation mentioned above, for FR2.

In some aspects, for further enhancements in terms of increasing the number of TCI states configured per CORESET, or the number of CORESETs configurable to the UE are considered, some relationship needs to be established between the overall number of TCI states, the TCI states for which UE may need to perform the beam management, and the TCI states which are mainly for the purpose of diversity. Particularly, this is important since following Rel-15 specification, each additional TCI state is also involved in beam management and beam-failure detection operation.

Techniques are disclosed herein to enable multi-TRP transmission of the DCI, e.g., possible enhancements of TCI/CQL configurations such as increasing the number of TCI/QCL states supported for PDCCH monitoring and reception, adjusting the maximum number of monitored CORESETs within a IMP, establishing relationship to beam management operation, and so forth.

Mechanisms to enhance simultaneous multi-panel reception with different TCI/QCL configurations.

Figure 2:
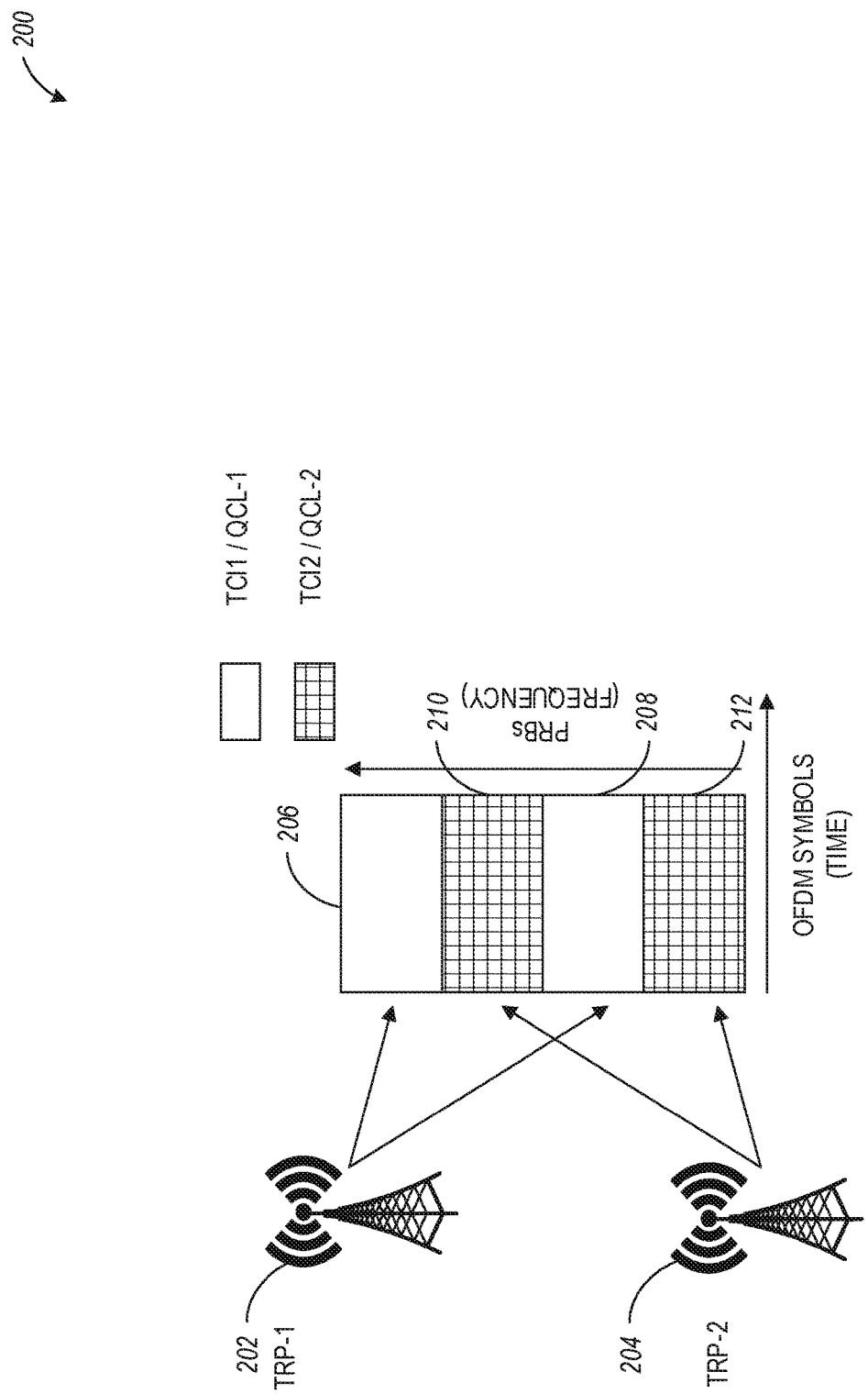
FIG. 2 illustrates multiple downlink data transmissions overlapping in time domain, which can be received simultaneously by a user equipment in accordance with some aspects.

FIG. 2 illustrates multiple downlink data transmissions overlapping in time domain, which can be received simultaneously in the same slot by a user equipment in accordance with some aspects.

In some aspects, enhancements may be considered in subsequent releases of NR specifications, for case of multiple DL control and/or data channel transmissions overlapping in time domain (i.e., FDM-based transmissions), potentially each with different spatial QCL configurations.

In some aspects and as illustrated in FIG. 2, a UE with multi-panel receiver capabilities (e.g., with p panels), can support simultaneous reception of a limited number of (e.g., two or s, where s<p) frequency division multiplexed (FDMed) PDCCHs/PDSCHs with different TCI-state configurations (e.g., with QCL type D). Referring to FIG. 2, diagram 200 illustrates TRPs 202 and 204 which can perform transmission of downlink information for simultaneous reception by a UE. More specifically, TRP 202 transmits downlink control information or data 206 and 208, and TRP 204 transmits downlink control information or data 210 and 212. Control information or data from the different TRPS is associated with different TO states and QCL configurations. As illustrated in FIG. 2, downlink control information or data from the two TRPs is frequency multiplexed and transmitted at the same time for simultaneous reception by the UE.

Mechanisms to enhance TCI/QCL configurations towards enabling multi-TRP transmission of DCI.

As mentioned above, some enhancements to robustness and reliability performance of PDCCH, e.g., for ultra-reliable low latency communication (URLLC) applications, may be used under multi-TRP operations. Enabling support of a larger number of TCI states for PDCCH monitoring, as well as increasing the number of CORESETs configured to UE, provide some directions of such enhancements.

In some aspects, for each component carrier (CC), it may be possible to configure N, e.g. N=64, TCI states by RRC signaling, where MAC CE can be used for down-selecting one of them as an active state.

In some aspects, the number of TCI states configurable by RRC signaling to the UE are increased to N'>N.

Increasing the number of TCI states configurable by RRC signaling can help reducing the RRC configuration overhead. Also, in light of potential future enhancements to increase the number of supported TRPs and panels, the impact of such increase in the supported value of N, may be even more pronounced.

Figure 3:
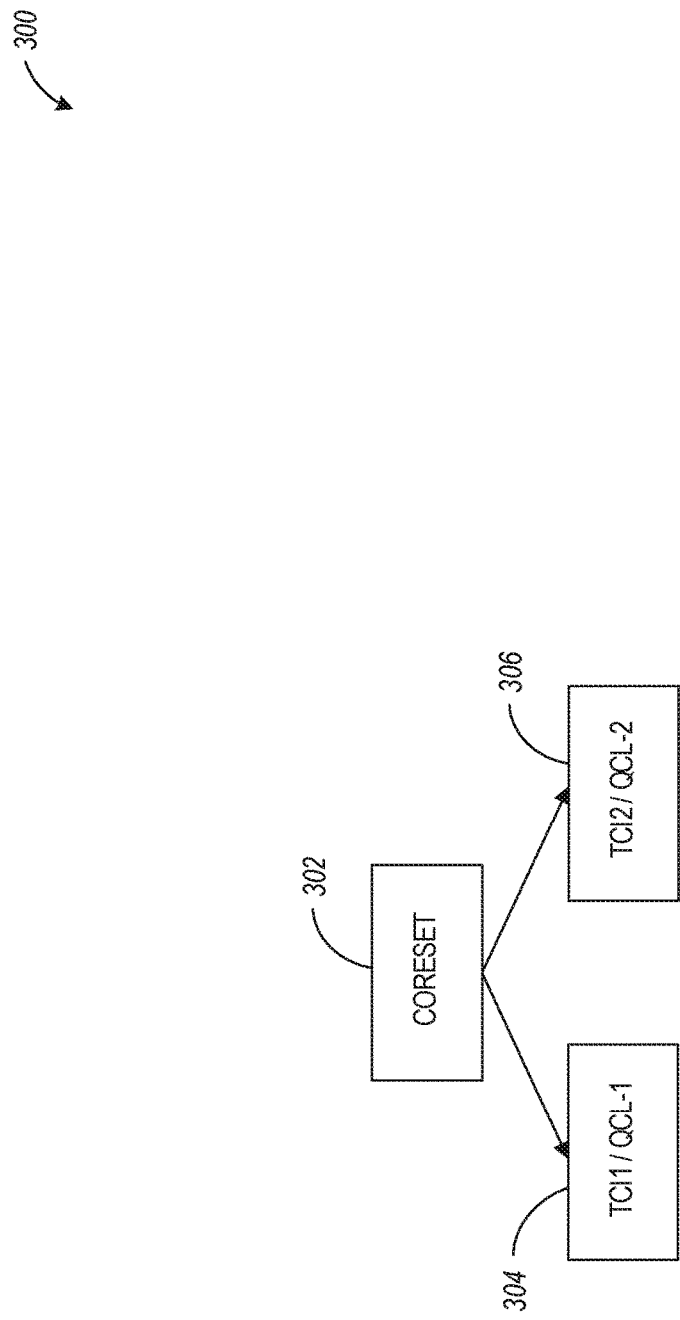
FIG. 3 illustrates a CORESET configuring multiple TCIs, in accordance with some aspects.

FIG. 3 illustrates a CORESET configuring multiple TCIs, in accordance with some aspects. In some aspects, based on reported UE capability, a configured CORESET may be associated with M' (>1) active TCI states each with a distinct spatial QCL assumption (QCL Type D according to NR. Rel-15). This will allow a UE to monitor PDCCH using M' distinct Rx beams. The M' Rx beams are obtained from tracking M' active TCI states per CORESET. Referring to FIG. 3, diagram 300 illustrates a CORESET 302 which configures TCI states 304 and 306, which TCI states are associated with a corresponding QCL information.

In some aspects, multiple active TCI states may be associated per CORESET and conveyed to the UE via UE-specific RRC signaling or MAC CE signaling.

In some aspects, a particular active TCI state (out of configured set of TCI states by RRC or MAC CE) may be indicated to the UE for monitoring of the PDCCH candidates as part of the corresponding search space configuration that points to this CORESET.

Figure 4:
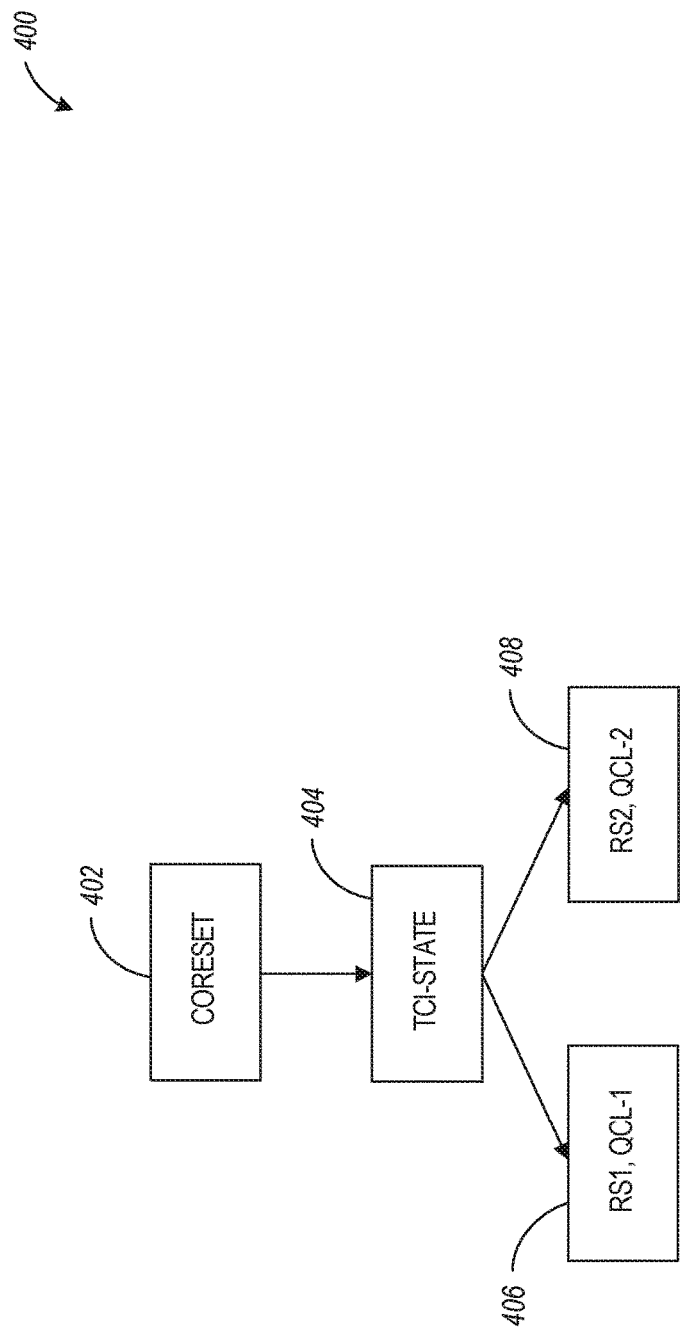
FIG. 4 illustrates a CORESET configuring a single TCI state associated with multiple reference signals and QCL information, in accordance with some aspects.

FIG. 4 illustrates a CORESET configuring a single TCI state associated with multiple reference signals and QCL information, in accordance with some aspects. In some aspects and as illustrated in FIG. 4, the number of reference signals (RSs) or synchronization signal blocks (SSBs) sharing the same QCL type in a TCI state may be increased to K, e.g. K=2 RSs for beam indication to the UE, in terms of PDCCH monitoring. Referring to FIG. 4, diagram 400 illustrates a CORESET 402 which configures a TCI state 404. The TCI state 404 may be associated with multiple reference signals such as 406 and 408, and corresponding QCL information.

Figure 5:
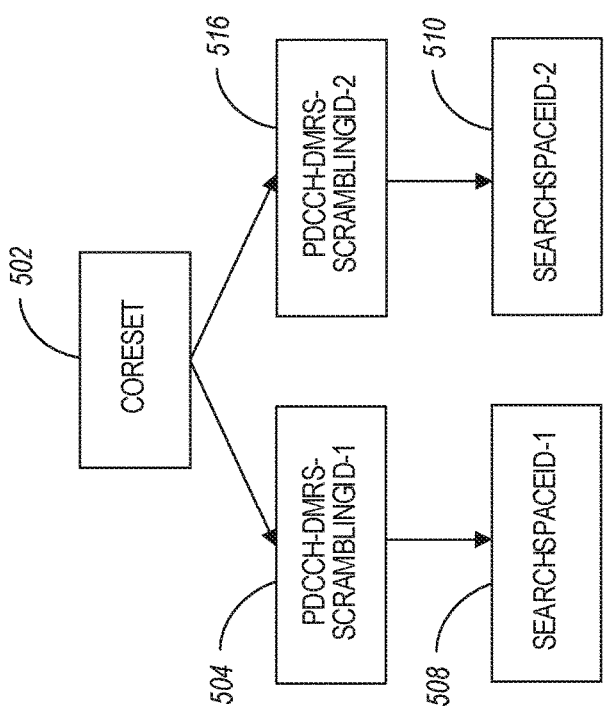
FIG. 5 illustrates a CORESET configuring multiple scrambling IDs, each scrambling ID associated with a separate search space, in accordance with some aspects.

FIG. 5 illustrates a CORESET configuring multiple scrambling IDs, each scrambling ID associated with a separate search space, in accordance with some aspects. In some aspects and as illustrated in diagram 500 in FIG. 5, a configured CORESET 502 may be associated with different scrambling IDs, such as pdcch-DMRS-ScramblingID-1 504 and pdcch-DMRS-ScramblingID-2 516, which scrambling IDs identify sequences for channel estimation of PDCCH or other downlink information. Assuming a UE is configured with two search spaces (with searchSpaceId-1 508 and searchSpaced-2 510) associated with the same CORESET 502. The UE may use pdcch-DMRS-ScramblingID-1 when monitoring PDCCH associated to searchSpaceId-1, and the UE may use pdcch-DMRS-ScramblingID-2 when monitoring PDCCH associated to searchSpaceId-2. The association between pdcch-DMRS-ScramblingID-1 and searchSpaceId-1 (and between pdcch-DMRS-ScramblingID-2 and searchSpaceId-2) may be indicated to the UE via higher-layer signaling.

In some aspects, the increased number of RSs sharing the same QCL type in a TCI state, enable multi-panel beam indication, e.g., RS1 is for UE panel 1 and RS2 is for UE panel 2, which can be used for the purpose of beam failure detection (BFD) or radio link monitoring (RLM) operation/detection.

In some aspects, the increased number of RSs sharing the same QCL type in a TCI state, may enable beam diversity, e.g., the additional RSs share the same spatial Rx parameters, and are not necessarily used for BFD/RLM.

In some aspects, a subset of the increased number of RSs sharing the same QCL type in TCI state, enable beam diversity and share the same spatial Rx parameters, while the rest provide multi-panel beam indication, and are monitored for the purpose of BFD/RLM operation/detection.

The first subset of RSs can be considered as "ancillary beams", primarily for diversity improvements, which can be used for diversity-based transmission, like multi-TRP transmission of physical channels, and are mainly to address blocking and not for UE connectivity. The second subset includes the "anchor beams" which could correspond to beam management operations (UE connectivity) as well.

In some aspects, the UE is indicated a subset of additionally configured beams/RSs for PDCCH monitoring, which it should monitor for the purpose of BFD/RLM operations/detection. The indication can be performed through UE-specific RRC signaling.

In some aspects, a maximum value is defined on the number of beams/RSs, which the UE may monitor for beam management procedures. A UE may be configured with more than 64 downlink reference signals for beam measurement by RRC signaling. In each beam reporting instance, the beam index (SSBRI or CRI) may take more than 6 bits.

In some aspects, the UE may be configured to monitor L>3 CORESETs per BWP, where it is able to track one or more active TCI states per CORESET at any time.

In some aspects, a UE may be configured to monitor up to L' (L'<=L) CORESETs for BFD and/or RLM in a BWP. If the reference signal(s) for BFD/RLM is not explicitly configured and L'<L, gNB should indicate which CORESET (s) should be monitored for BFD/RLM. The following options may be used to indicate the CORESETs for BFD/RLM:

Option 1: Such indication may be explicitly configured via RRC signaling, e.g. one indicator with the candidate value of {"BFD only", "RLM only", "BFD and RLM", "not used for BFD or RLM"} in each CORESET.

Option 2: Such indication may be indicated implicitly, e.g. the CORESETs with TCI states for UE antenna panel x, where x can be configured by RRC signaling or be pre-defined, should be used for BFD/RLM.

ADDITIONAL ASPECTS

In some aspects, a method for new radio (NR) communications includes enhancements to TCL/QCL configurations to the UE, where for each component carrier (CC), it is possible to configure N' TCI states by RRC signaling, and MAC CE down-selects a subset of them, for the purpose of PDCCH monitoring and reception. In some aspects, the number of TCI states configurable by RRC to the UE are increased to N'>N, where N indicates the number of configurable TCI states to the UE, by RRC signaling for each component carrier (CC) in release-15 NR specification, e.g. N=64. In some aspects, based on reported UE capability, a configured CORESET is associated with M' (>1) active TCI states each with a distinct spatial QCL assumption (QCL Type D according to NR Rel-15). This will allow a UE to monitor PDCCH using M' distinct Rx beams. The M' Rx beams are obtained from tracking M' active TCI states per CORESET.

In some aspects, a configured CORESET is associated with pdcch-DMRS-ScramblingID-1 and pdcch-DMRS- ScramblingID-2. Assuming a UE is configured with two search spaces (with searchSpaceId-1 and searchSpaceId-2) associated with the same CORESET, the UE will use pdcch-DMRS-ScramblingID-1 when monitoring PDCCH associated to searchSpaceId-1 and pdcch-DMRS-ScramblingID-2 when monitoring PDCCH associated to searchSpaceId-2. The association between pdcch-DMRS-ScramblingID-1 and searchSpaceId-1 (and between pdcch-DMRS-ScramblingID-2 and searchSpaceId-2) is indicated to the UE via higher-layer signaling.

In some aspects, the number of RSs/SSBs sharing the same QCL type in a TCI state is increased to K, e.g. K=2, RSs for beam indication to UE. In some aspects, the increased number of RSs sharing the same QCL type in TCI state, enable multi-panel beam indication, e.g., RS1 is for UE panel 1 and RS2 is for UE panel 2, which can be used for the purpose of BFD/RLM operation/detection. In some aspects, the increased number of RSs sharing the same QCL type in TCI state, enables beam diversity, e.g., the additional RSs share the same spatial Rx parameters, and are not necessarily used for BFD/RLM.

In some aspects, a subset of the increased number of RSs sharing the same QCL type in TCI state, enable beam diversity and share the same spatial Rx parameters, while the rest provide multi-panel beam indication, and are monitored for the purpose of BFD/RLM operation/detection. The first subset of RSs form "ancillary beams", primarily for diversity-based transmission, e.g., multi-TRP transmission of physical channels. The second subset consists of the "anchor beams" which could correspond to beam management operations (UE connectivity) as well. In some aspects, the UE is indicated a subset of additionally configured beams/RSs for PDCCH monitoring, which it should monitor for the purpose of BFD/RLM operations/detection. The indication can be performed through UE-specific RRC signaling.

In some aspects, a maximum value is defined on the number of beams/RSs which the LYE should monitor for beam management procedures. A UE may be configured with more than 64 downlink reference signals for beam measurement by RRC signaling. In each beam reporting instance, the beam index (SSBRI or CRI) may take more than 6 bits.

In some aspects, the UE can be configured to monitor L>3 CORESETs per BWP, where it is able to track one or more active TCI states per CORESET at any time. In some aspects, association of multiple active TCI states per CORESET is conveyed to the UE via UE-specific RRC or MAC CE signaling. In some aspects, a particular active TCI state (out of configured set of TCI states by RRC or MAC CE) is indicated to the UE for monitoring of the PDCCH candidates as part of the corresponding search space configuration that points to this CORESET. In some aspects, a UE shall expect to be configured to monitor up to L' (L'<=L) CORESETs for BFD and/or RLM in a BWP. If the reference signal(s) for BFD/RLM is not explicitly configured and L'<L, gNB should indicate which CORESET(s) should be monitored for BFD/RLM In some aspects, such indication may be explicitly configured via RRC signaling, e.g. one indicator with the candidate value of {"BFD only", "RLM only", "BFD and RLM", "not used for BFD or RLM"} in each CORESET. In some aspects, such indication may be indicated implicitly, e.g. the CORESETs with TCI states for UE antenna panel x, where x can be configured by RRC signaling or be predefined, should be used for BFD/RLM. In some aspects, a UE with multi-panel receiver capabilities (e.g., with p panels), can support simultaneous reception of a limited number of (e.g., two or s, where s<p) FDM-ed PDCCHs/PDSCHs with different TCI-state configurations (e.g., with QCL type D).

Figure 6:
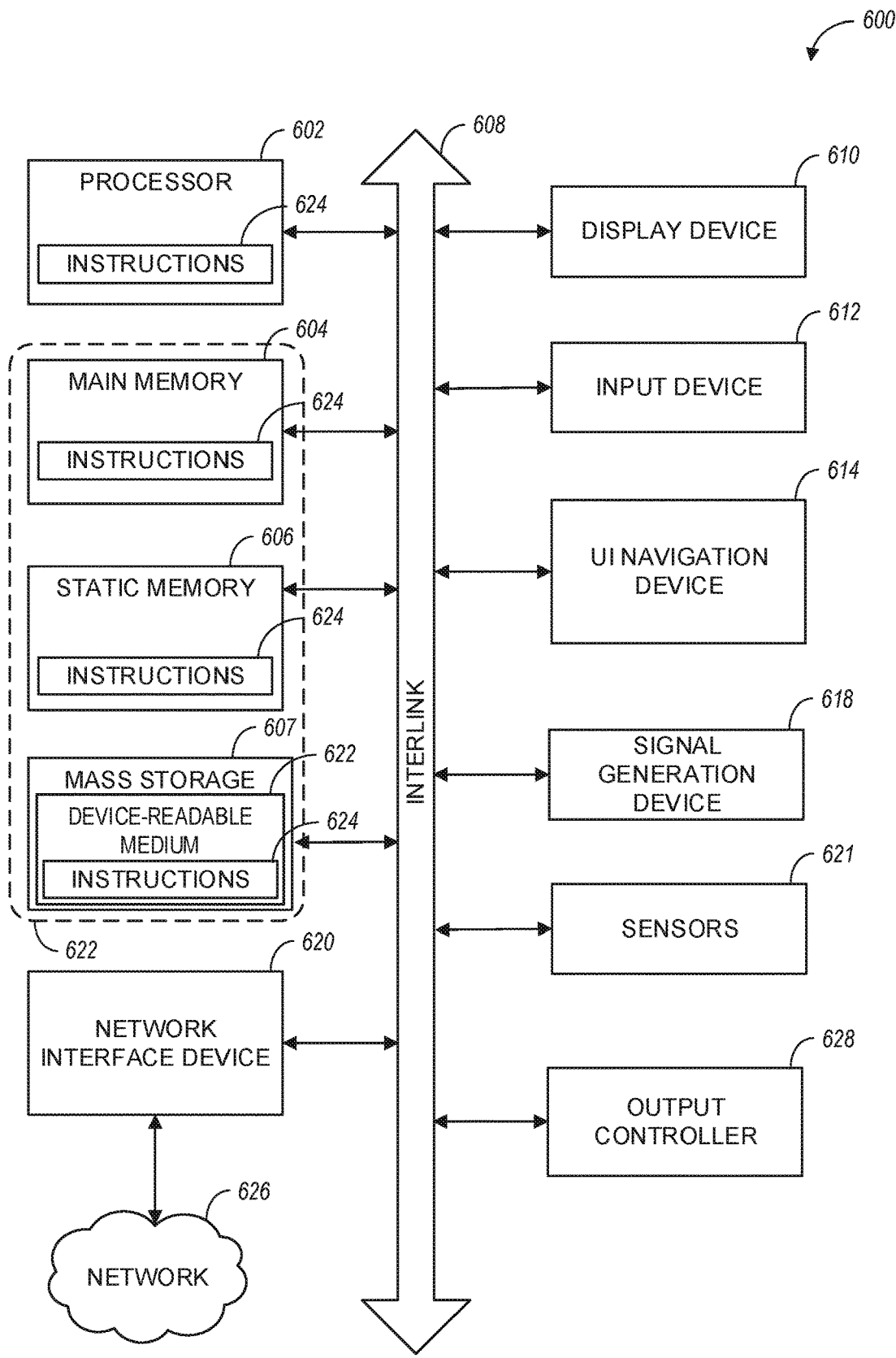
FIG. 6 illustrates a block diagram of a communication device such as an evolved Node-B (eNB), a new generation Node-B (gNB), an access point (AP), a wireless station (STA), a mobile station (MS), or a user equipment (UE), in accordance with some aspects.

FIG. 6 illustrates a block diagram of a communication device such as an evolved Node-B (eNB), a next generation Node-B (gNB), an access point (AP), a wireless station (STA), a mobile station (MS), or a user equipment (UE), in accordance with some aspects and to perform one or more of the techniques disclosed herein. In alternative aspects, the communication device 600 may operate as a standalone device or may be connected (e.g., networked) to other communication devices.

Circuitry (e.g., processing circuitry) is a collection of circuits implemented intangible entities of the device 600 that include hardware (e.g., simple circuits, gates, logic, etc.). Circuitry membership may be flexible over time. Circuitries include members that may, alone or in combination, perform specified operations when operating. In an example, the hardware of the circuitry may be immutably designed to carry out a specific operation (e.g., hardwired). In an example, the hardware of the circuitry may include variably connected physical components (e.g., execution units, transistors, simple circuits, etc.) including a machine-readable medium physically modified (e.g., magnetically, electrically, moveable placement of invariant massed particles, etc.) to encode instructions of the specific operation.

In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the device 600 follow.

In some aspects, the device 600 may operate as a standalone device or may be connected (e.g., networked) to other devices. In a networked deployment, the communication device 600 may operate in the capacity of a server communication device, a client communication device, or both in server-client network environments. In an example, the communication device 600 may act as a peer communication device in peer-to-peer (P2P) (or other distributed) network environment. The communication device 600 may be a UE, eNB, PC, a tablet PC, a STB, a PDA, a mobile telephone, a smartphone, a web appliance, a network router, switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), and other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a communication device-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. The software may accordingly configure a hardware processor, for example, to constitute a particular module at one instance of time and to constitute a different module at a different instance of time.

Communication device (e.g., UE) 600 may include a hardware processor 602 (e.g., a central processing unit (CPU), a graphics processing unit (GPU), a hardware processor core, or any combination thereof), a main memory 604, a static memory 606, and mass storage 607 (e.g., hard drive, tape drive, flash storage, or other block or storage devices), some or all of which may communicate with each other via an interlink (e.g., bus) 608.

The communication device 600 may further include a display device 610, an alphanumeric input device 612 (e.g., a keyboard), and a user interface (UI) navigation device 614 (e.g., a mouse). In an example, the display device 610, input device 612 and UI navigation device 614 may be a touchscreen display. The communication device 600 may additionally include a signal generation device 618 (e.g., a speaker), a network interface device 620, and one or more sensors 621, such as a global positioning system (GPS) sensor, compass, accelerometer, or another sensor. The communication device 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 607 may include a communication device-readable medium 622, on which is stored one or more sets of data structures or instructions 624 (e.g., software) embodying or utilized by any one or more of the techniques or functions described herein. In some aspects, registers of the processor 602, the main memory 604, the static memory 606, and/or the mass storage 607 may be, or include (completely or at least partially), the device-readable medium 622, on which is stored the one or more sets of data structures or instructions 624, embodying or utilized by any one or more of the techniques or functions described herein. In an example, one or any combination of the hardware processor 602, the main memory 604, the static memory 606, or the mass storage 616 may constitute the device-readable medium 622.

As used herein, the term "device-readable medium" is interchangeable with "computer-readable medium" or "machine-readable medium". While the communication device-readable medium 622 is illustrated as a single medium, the term "communication device-readable medium" may include a single medium or multiple media (e.g., a centralized or distributed database, and/or associated caches and servers) configured to store the one or more instructions 624.

The term "communication device-readable medium" is inclusive of the terms "machine-readable medium" or "computer-readable medium", and may include any medium that is capable of storing, encoding, or carrying instructions (e.g., instructions 624) for execution by the communication device 600 and that cause the communication device 600 to perform any one or more of the techniques of the present disclosure, or that is capable of storing, encoding or carrying data structures used by or associated with such instructions. Non-limiting communication device-readable medium examples may include solid-state memories and optical and magnetic media. Specific examples of communication device-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, communication device-readable media may include non-transitory communication device-readable media. In some examples, communication device-readable media may include communication device-readable media that is not a transitory propagating signal.

The instructions 624 may further be transmitted or received over a communications network 626 using a transmission medium via the network interface device 620 utilizing any one of a number of transfer protocols. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input-multiple-output (SEM), MIMO, or multiple-input-single-output (MISO) techniques. In some examples, the network interface device 620 may wirelessly communicate using Multiple User MIMO techniques.

The term "transmission medium" shall be taken to include any intangible medium that is capable of storing, encoding or carrying instructions for execution by the communication device 600, and includes digital or analog communications signals or another intangible medium to facilitate communication of such software. In this regard, a transmission medium in the context of this disclosure is a device-readable medium.

A communication device-readable medium may be provided by a storage device or other apparatus which is capable of hosting data in a non-transitory format. In an example, information stored or otherwise provided on a communication device-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the communication device-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable etc.) at a local machine, and executed by the local machine.

Although an aspect has been described with reference to specific exemplary aspects, it will be evident that various modifications and changes may be made to these aspects without departing from the broader scope of the present disclosure. Accordingly, the specification and drawings are to be regarded in an illustrative rather than a restrictive sense. This Detailed Description, therefore, is not to be taken in a limiting sense, and the scope of various aspects is defined only by the appended claims, along with the full range of equivalents to which such claims are entitled.

What is claimed is:

1. An apparatus comprising:
one or more processors, wherein to configure a user equipment (UE) for reception, the one or more processors are configured to:
decode radio resource control (RRC) signaling, the RRC signaling comprising configuration information configuring a plurality of transmission configuration indication (TCI) states;
decode a media access control (MAC) control element (CE), the MAC CE indicating multiple active TCI states of the configured plurality of TCI states;
determine multiple received beams using the multiple active TCI states; and
decode downlink information, wherein the downlink information includes first and second portions, wherein respective first and second portions have different TCI states of the multiple active states and are received via at least one of the determined multiple receive beams associated with the multiple active TCI states, wherein the first and second portions of the downlink information are frequency division multiplexed with each other.

2. The apparatus of claim 1, wherein the downlink information is physical downlink shared channel (PDSCH) data or physical downlink control channel (PDCCH) information.

3. The apparatus of claim 2, wherein the first portion of the downlink information originates from a first transmission reception point (TRP) of multiple TRPs, and the second portion of the downlink information originates from a second TRP of the multiple TRPs.

4. The apparatus of claim 1, wherein the first and second portions of the downlink information are received simultaneously by the UE via different receive beams of the determined multiple receive beams.

5. The apparatus of claim 4, wherein the one or more processors are further configured to:
receive the first portion of the downlink information using a first antenna panel of a multi-panel receiver, and the second portion of the downlink information is received using a second antenna panel of the multi-panel receiver.

6. The apparatus of claim 1, wherein the one or more processors are further configured to:
decode second RRC signaling, the second RRC signaling comprising configuration information configuring time and frequency resources of a control resource set (CORESET) for physical downlink control channel (PDCCH) reception.

7. The apparatus of claim 6, wherein the CORESET is associated with the multiple active TCI states, with each active TCI state associated with a different quasi-co-location (QCL) information, and wherein the one or more processors are further configured to:
track the active TCI states associated with the CORESET to obtain the multiple receive beams; and
perform the PDCCH reception using the multiple receive beams.

8. The apparatus of claim 6, wherein the CORESET is associated with a single active TCI state of the configured plurality of TCI states, wherein the single active TCI state is associated with multiple reference signals (RSs) or synchronization signal blocks (SSBs), the multiple RSs or SSBs being associated with different quasi-co-location (QCL) information, and wherein the one or more processors are further configured to:
obtain at least one receive beam based on the QCL information associated with the multiple RSs or SSBs; and
perform the PDCCH reception using the at least one receive beam.

9. The apparatus of claim 6, wherein the CORESET is associated with multiple scrambling IDs, each scrambling ID identifying a channel estimation scrambling sequence.

10. The apparatus of claim 9, wherein the one or more processors are further configured to:
decode higher layer signaling indicating an association of each scrambling ID of the multiple scrambling IDs with a search space ID of corresponding multiple search space IDs, the search space ID identifying a search space for PDCCH monitoring; and
perform the PDCCH monitoring using at least one of the multiple search space IDs and a corresponding scrambling ID of the multiple scrambling IDs associated with the CORESET.

11. The apparatus of claim 1, further comprising transceiver circuitry coupled to the one or more processors; and, one or more antennas coupled to the transceiver circuitry.

12. A non-transitory computer-readable storage medium that stores instructions for execution by one or more processors of a network node, wherein the instructions to cause the network node to:
encode radio resource control (RRC) signaling, the RRC signaling comprising configuration information configuring a plurality of transmission configuration indication (TCI) states to a user equipment (UE);

encode a media access control (MAC) control element (CE), the MAC CE indicating multiple active TCI states of the configured plurality of TCI states; and encode downlink information for transmission to the UE, the downlink information associated with one of the multiple active TCI states and frequency multiplexed with downlink information associated with a second of the multiple active TCI states.

13. The non-transitory computer-readable storage medium of claim 12, wherein the instructions further cause the network node to:

encode second RRC signaling, the second RRC signaling comprising configuration information configuring time and frequency resources of a control resource set (CORESET) for physical downlink control channel (PDCCH) reception, wherein the CORESET is associated with the multiple active TCI states, with each active TCI state associated with a different quasi-co-location (QCL) information.

14. A non-transitory computer-readable storage medium that stores instructions for execution by one or more processors of a user equipment (UE) operating, the instructions to configure the one or more processors for reception and to cause the UE to:

decode radio resource control (RRC) signaling, the RRC signaling comprising configuration information configuring a plurality of transmission configuration indication (TCI) states;

decode a media access control (MAC) control element (CE), the MAC CE indicating multiple active TCI states of the configured plurality of TCI states;

determine multiple received beams using the multiple active TCI states; and decode downlink information, wherein the downlink information includes first and second portions, wherein respective first and second portions have different TCI states of the multiple active states and are received via at least one of the determined multiple receive beams associated with the multiple active TCI states, wherein the first and second portions of the downlink information are frequency division multiplexed with each other.

15. The non-transitory computer-readable storage medium of claim 14, wherein the first portion of the downlink information originates from a first transmission reception point (TRP) of multiple TRPS, and the second portion of the downlink information originates from a second TRP of the multiple TRPs.

16. The non-transitory computer-readable storage medium of claim 14, wherein the first and second portions of the downlink information are received simultaneously by the UE via different receive beams of the determined multiple receive beams.

17. The non-transitory computer-readable storage medium of claim 16, wherein executing the instructions further cause the UE to:

receive the first portion of the downlink information using a first antenna panel of a multi-panel receiver, and the second portion of the downlink information is received using a second antenna panel of the multi-panel receiver.

18. The non-transitory computer-readable storage medium of claim 14, wherein executing the instructions further cause the UE to:

decode second RRC signaling, the second RRC signaling comprising configuration information configuring time and frequency resources of a control resource set (CORESET) for physical downlink control channel (PDCCH) reception.

19. The non-transitory computer-readable storage medium of claim 18, wherein the CORESET is associated with the multiple active TCI states, with each active TCI state associated with a different quasi-co-location (QCL) information, and wherein executing the instructions further cause the UE to:

track the active TCI states associated with the CORESET to obtain the multiple receive beams; and perform the PDCCH reception using the multiple receive beams.

20. The non-transitory computer-readable storage medium of claim 18, wherein the CORESET is associated with a single active TCI state of the configured plurality of TCI states, wherein the single active TCI state is associated with multiple reference signals (RSs) or synchronization signal blocks (SSBs), the RSs or SSBs being associated with different quasi-co-location (QCL) information, and wherein executing the instructions further cause the UE to:

obtain at least one receive beam based on the QCL information associated with the multiple RSs or SSBs; and perform the PDCCH reception using the at least one receive beam.

* * * * *